3,538,090
1-(4-TERTIARYAMINOPHENYL)-3-(PIPERAZINO)-
PROPANOLS
George de Stevens, Woodland Park, N.J., assignor to Ciba
 Corporation, New York, N.Y., a corporation of Delaware
Continuation-in-part of application Ser. No. 584,350,
 Oct. 5, 1966. This application June 1, 1967, Ser.
 No. 642,718
Int. Cl. C07d 87/40
U.S. Cl. 260—247.5                2 Claims

ABSTRACT OF THE DISCLOSURE 3-(4-arylpiperazino)-aminopropiophenones, of the formula

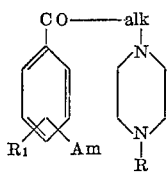

alk=alkylene separating adjacent groups by 2 C
Am=tert. amino group
R=iso- or heterocyclic aryl
$R_1$=H, alkyl, alkoxy, alkylmercapto, halogeno, $CF_3$ or $NO_2$ quaternaries and salts thereof are tranquilizers. Also included are the corresponding aminopropanols useful as intermediates for the preparation of the aminopropiophenones.

CROSS-REFERENCE TO RELATED APPLICATION

This is a continuation-in-part of application Ser. No. 584,350, filed Oct. 5, 1966.

SUMMARY OF THE INVENTION

The present invention concerns and has for its object the provision of new 3 - (4 - arylpiperazino) - tert. aminopropiophenones, more particularly those of the Formula I

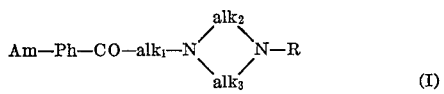

in which Am stands for a tertiary amino group, Ph for a phenylene radical, each of $alk_1$, $alk_2$ and $alk_3$ for lower alkylene separating the adjacent groups by two carbon atoms and R for an iso- or heterocyclic aryl radical, quaternaries and salts thereof, corresponding pharmaceutical compositions, new starting materials and methods for the preparation of these products. Said compositions are especially useful as central nervous system depressants.

DESCRIPTION OF THE PREFERRED EMBODIMENTS

In Formula I, the tertiary amino group Am is substituted, for example, by aliphatic, cycloaliphatic or araliphatic hydrocarbon radicals. Preferred amino groups Am are di-lower alkylamino, N-lower alkyl-N-lower alkenylamino, N-lower alkyl-N-cycloalkylamino, N-lower alkyl-N-cycloalkyl-lower alkylamino with preferably 3 to 7 ring-carbon atoms, N-lower alkyl-N-monocyclic carbocyclic aryl-lower alkylamino or N-lower alkyl -N-arylamino, mono- or bicyclic lower alkyleneimino (or N-azacycloalkyl or -bicycloalkyl respectively), aralkyleneimino, hydroxy-aralkyleneimino or lower monocyclic, monoaza-, -oxa- or -thiaalkyleneimino, N-lower alkyl-free or esterified N-hydroxy-lower alkyl-, e.g. N-lower alkanoyloxy-lower alkyl- or N-monocyclic carbocyclic aryl-lower alkyl- or N-aryl-azaalkyleneimino, wherein the heteroatoms are separated from each other by at least 2 carbon atoms and "lower" defines the respective radicals with up to 7 carbon atoms, such as dimethylamino, methylethylamino, diethylamino, di-n- or i-propylamino or di-n-butylamino; N-methyl-N-allylamino, N-n-propyl-N-allylamino or N-methyl-N-2-butenylamino; N - methyl - N - cyclopropylamino, N-ethyl-N-cyclopentylamino, N-methyl - N - cyclohexylamino, N - n - propyl - N - cyclopropylamino or N-methyl-N-cycloheptylamino; N - methyl - N - cyclopropylmethylamino, N-ethyl-N-(2-cyclopentylethyl)-amino or N-methyl-N-cyclopentylmethylamino; N-methyl - N - benzylamino, N-methyl-N-(1- or 2-phenylethyl)-amino; N-methyl-N-phenylamino, N-i-propyl-N-phenylamino or N-n-butyl-N-phenylamino; ethyleneimino, pyrrolidino, piperidino, 1,4-pentyleneimino, 3-methyl-, 3-phenyl- or 3-hydroxy-3-phenyl-1,5-pentyleneimino, 2,5- or 1,6-hexyleneimino, 2,6 - heptyleneimino, 2-aza-2-bicyclo[2,2,1]heptyl, 2-aza-2-bicyclo[2,2,2] or [3,2,1]octyl, 3-aza-3-bicyclo[3,2,1] or [3,3,0]-octyl, 2-aza-2-bicyclo[3,2,2] or [3,3,1]-nonyl, 3-aza-3-bicyclo[3,2,2] or [3,3,1]nonyl, 2-aza-2-, 3-aza-3-, 7-aza-7- or 8-aza-8-bicyclo[4,3,0]nonyl or 2-aza-2- or 3-aza-3-bicyclo[4,4,0]decyl; piperazino, 3-aza-1,6-hexyleneimino, 4 - aza - 1,7-heptyleneimino, morpholino, 3,5 - dimethyl-morpholino, thiamorpholino, N-methyl-, N-ethyl-, N-(2-hydroxyethyl)-, N-(2-acetoxyethyl)-, N-benzyl- or N-phenyl-piperazino, -3-aza-1,6-hexyleneimino or -4-aza-1,7-heptyleneimino.

The iso- or heterocyclic aryl radical R more particularly stands for monocyclic aryl containing up to 2 heteroatoms, preferably nitrogen, oxygen and/or sulfur atoms, such as phenyl, pyridyl, furyl, thienyl, pyridazyl, pyrimidyl, pyrazinyl, oxazinyl or thiazinyl. These radicals, as well as those aryl radicals present in the above amino group Am and the phenylene radical Ph, are unsubstituted or substituted by one or more than one of the same or of different substituents attached to any of the positions available for substitution. Such substituents are, for example, lower alkyl, e.g. methyl, ethyl, n- or i-propyl, or -butyl, etherified hydroxy or mercapto, such as lower alkoxy, alkyleneidioxy or alkylmercapto, e.g. methoxy, ethoxy, n- or i-propoxy or -butoxy, methylenedioxy, 1,1- or 1,2-ethylenedioxy, methyl- or ethylmercapto or esterified hydroxy, such as halogeno, e.g. fluoro, chloro or bromo, trifluoromethyl, nitro or amino, such as di-lower alkylamino, e.g. dimethylamino or diethylamino.

Preferred phenylene radicals Ph are 1,4-phenylene, (lower alkyl)-1,4-phenylene, (lower alkoxy)-1,4-phenylene, (lower alkylmercapto) - 1,4 - phenylene, (halogeno) - 1,4-phenylene, (trifluoromethyl)-1,4-phenylene or (nitro)-1,4-phenylene, and preferred iso- or heterocyclic radicals R are phenyl, (lower alkyl)-phenyl, (lower alkoxy)-phenyl, (lower alkylmercapto)-phenyl, (halogeno)-phenyl, (trifluoromethyl)-phenyl, (nitro)-phenyl, (di-lower alkylamino)-phenyl, pyridyl, (lower alkyl)-pyridyl, furyl, (lower alkyl)-furyl, thienyl, (lower alkyl)-thienyl, pyridazyl, (lower alkyl)-pyridazyl, pyrimidyl, (lower alkyl)-pyrimidyl, pyrazinyl, (lower alkyl)-pyrazinyl, oxazinyl, (lower alkyl)-oxazinyl, thiazinyl or (lower alkyl)-thiazinyl.

The lower alkylene radicals $alk_1$, $alk_2$ and $alk_3$ preferably stand for 1,2-ethylene, but also for 1,2-propylene, 1,2- or 2,3-butylene, 1,2- or 2,3-pentylene or 3,4-hexylene.

Quaternaries of the invention are preferably lower alkyl- or aralkyl-quaternaries, e.g. the methyl-, ethyl-, propyl-, benzyl-, 1- or 2-phenylethyl-quaternaries.

The compounds of this invention exhibit valuable pharmacological properties. Apart from adrenolytic, analgesic, hypothermic, hypotensive and the action of reserpine or pentothal potentiating or the stimulus of amphetamine, caffeine, cocaine or morphine reversing effects, they show primarily central nervous system depressing effects, as can be demonstrated in animal tests using, for example mammals, such as mice, rats, rabbits, dogs or monkeys, as test objects. Besides their above-mentioned main use, they also can be used as intermediates in the preparation of other valuable products, especially of pharmacologically active compounds.

Particularly useful are compounds of the Formula I in which Am stands for lower alkyleneimino, lower mono-aza, oxa- or -thiaalkyleneimino in which the heteroatoms are separated by at least 2 carbon atoms, Ph for 1,4-phenylene, (lower alkyl)-1,4-phenylene, (lower alkoxy)-1,4-phenylene, (lower alkylmercapto)-1,4-phenylene, (halogeno)-1,4-phenylene or (nitro)-1,4-phenylene, each of $alk_1$, $alk_2$ and $alk_3$ for 1,2-ethylene or 1,2-propylene and R for phenyl, (lower alkyl)-phenyl, (lower alkoxy)-phenyl, (lower alkylmercapto)-phenyl, (halogeno)-phenyl, (nitro)-phenyl, pyridyl or (lower alkyl)-pyridyl, and acid addition salts thereof, as well as those compounds of Formula I in which Am stands for di-lower alkylamino, bicyclic alkyleneimino with up to 10 carbon atoms, $R_0$-lower alkyleneimino, $R_0$-hydroxy-lower alkyleneimino or N-lower alkyl-, N-hydroxy-lower alkyl-, N-$R_0$-lower alkyl-, or N-$R_0$-lower mono-aza-alkyleneimino in which the heteroatoms are separated by at least 2 carbon atoms, Ph for 1,4-phenylene, (lower alkyl)-1,2-phenylene, (lower alkoxy)-1,4-phenylene, (lower alkylmercapto)-1,4-phenylene, (halogeno)-1,4-phenylene or (nitro)-1,4-phenylene, each of $alk_1$, $alk_2$ and $alk_3$ for 1,2-ethylene or 1,2-propylene and each of R and $R_0$ for phenyl, (lower alkyl)-phenyl, (lower alkoxy)-phenyl, (lower alkylmercapto)-phenyl, (halogeno)-phenyl, (nitro)-phenyl, pyridyl or (lower alkyl)-pyridyl, and acid addition salts thereof.

Especially valuable are compounds of the Formula II

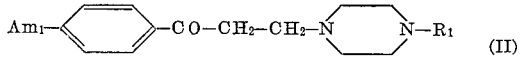 (II)

in which $Am_1$ stands for pyrrolidino, piperidino, 4-methyl-piperazino, 4-ethyl-piperazino, 4-(2-hydroxy-ethyl)-piperazino or morpholino and $R_1$ for phenyl, (methyl)-phenyl, (methoxy)-phenyl, (chloro)-phenyl, pyridyl or (methyl)-pyridyl, and therapeutically useful acid addition salts thereof, as well as those of Formula II, in which $Am_1$ stands for dimethylamino, 3-aza-3-bicyclo[3,2,2]nonyl, 4-hydroxy-4-phenyl-piperidino or 4-phenyl-piperazino and $R_1$ has the meaning given above, which when orally or subcutaneously applied to mice or rats in a dosage range between about 1 and 50 mg./kg./day, show outstanding central nervous depressing effects, or when subcutaneously applied to mice in a dosage range between about 50 and 100 mg./kg./day, show outstanding analgesic effects, or when intraperitoneally applied to agressive rats (with septal lesions) in a dosage range between about 1 and 10 mg./kg./day, show outstanding taming effects, or when subcutaneously applied to mice in a dosage range between about 0.5 and 5 mg./kg./day, markedly potentiate the pentothal or reserpine effects or reverse the amphetamine, caffeine, cocaine or morphine effects, or when orally applied to monkeys at doses between about 3 and 30 mg./kg./day, show outstanding antianxiety and sedative effects.

The compounds of this invention are prepared according to know methods. For example, the process for their preparation consists in (a) Condensing a lower alkanoyl-aniline and a 1-aryl-piperazine with formaldehyde or its reactive derivatives, more particularly those of the formulae

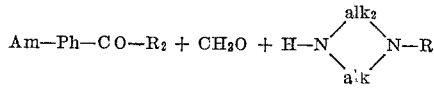

in which $R_2$ stands for lower alkyl, preferably methyl, or (b) Condensing a β-$R_3$-alkanoyl-aniline with an $R_4$-substituted aromatic compound in which one of $R_3$ and $R_4$ stands for (α) reactively esterified hydroxy or (β) primary amino, and the other for (α) an N-unsubstituted piperazino radical or (β) reactively esterified bis-(2-hydroxy-lower alkyl)-amino respectively, more particularly those of the formulae

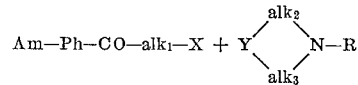

in which X stands for reactively esterified hydroxy and Y for imino, or X for amino and Y for two reactively esterified hydroxy groups, or (c) Condensing a β-(2-arylamino-lower alkylamino)-alkanoyl-aniline with a reactively esterified α,β-lower alkylene glycol, more particularly those of the formulae

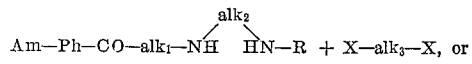

(d) Condensing a reactive functional β-(4-arylpiperazino)-lower alkanoyl derivative of the corresponding (α) acid or (β) phenole ester, with (α) an aniline or (β) a secondary amine respectively, more particularly those of the formulae

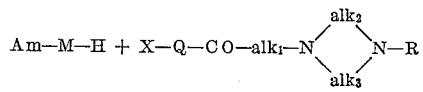

in which one of M and Q stands for Ph and the other for a direct bond and X for reactively esterified hydroxy, or (e) Oxidizing a 3-(4-arylpiperazino)-1-(aminophenyl)-propanol, more particularly that of the formula

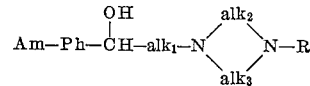

and converting in any resulting 3-(4-arylpiperazino)-prim. or sec. aminopropiophenone the primary or secondary amino group into a tertiary amino group and, if desired, converting any resulting compound into another compound of the invention.

A reactive derivative of formaldehyde is, for example, paraformaldehyde, or an acetal, e.g. dimethoxymethane. A reactive ester of the above-mentioned alcohols is, for example, that of a mineral or sulfonic acid, preferably that of a hydrohalic acid, e.g. hydrochloric or hydrobromic acid, sulfuric, methane-, ethane-, benzene- or p-toluene-sulfonic acid. A reactive ester of the above phenols, is advantageously that of hydrofluoric or hydrochloric acid. A reactive functional acid derivative is, for example, a halide, a simple or mixed anhydride.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure. Condensing agents are especially used in the reaction with said reactive esters or acid derivatives in order to eliminate any acid formed. They are basic agents, for example, alkali or alkaline earth metal carbonates or lower alkoxides, or organic nitrogen bases, such as pyridine or collidine, advantageously aliphatic tertiary amines, such as tri-lower alkylamines, e.g. triethylamine. The Mannich reaction according to item (a) is carried out in the usual manner and in the acylation according to item (d) Lewis acids are advantageously used as condensing agents, such as aluminum chloride or polyphosphoric acid. In the oxidation according to item (e) inorganic or organic oxidation agents may be used, such as chromic acid, cupric acetate or ketones in the presence of metal alkoxides, e.g. acetone and aluminum tert. butoxide. Resulting primary or secondary amines can advantageously be converted into tertiary amines with the use of reactive esters of the corresponding alcohols or glycols, for example analogous to reaction (b) or by reductive alkalation. Resulting compounds of the invention may be converted into each other according to known methods. For example, any secondary amino group present, e.g. within an azaalkyleneimino group Am, may be substituted with the use of reactive esters of alcohols, preferably of lower alkanols or by reductive alkylation. Resulting tertiary bases may analogously be quaternized, for example, with the use of lower alkyl or aralkyl halides, e.g. chlorides, bromides or iodides. Furthermore, any nitro groups present may be reduced in the usual manner, for example with the use of nascent hydrogen.

The compounds of the invention are obtained in the free form or in the form of their salts, depending on the conditions under which the process is carried out; the salts are also included in the present invention. Salts that are obtained can be converted into the free bases in known manner, for example, with alkalies or ion exchangers. Free bases that are obtained can be converted into salts by reaction with inorganic or organic acids, especially those that are suitable for the formation of therapeutically useful salts. Such acids are, for example mineral acids, e.g. hydrochloric, hydrobromic, sulfuric, phosphoric, nitric or perchloric acid; aliphatic or aromatic carboxylic or sulfonic acids, e.g. formic, acetic, propionic, succinic, glycollic, lactic, malic, tartaric, citric, ascorbic, maleic, hydroxy-maleic, pyroracemic, phenylacetic, benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophane, lysine and arginine.

These or other salts of the invention, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines mentioned above may be used in the form of their alkali metal, e.g. sodium or potassium salts. Mainly, those starting materials should be used in the process of the invention that lead to the formation of those compounds indicated above as being specially valuable.

The starting material used is known or, if new, may be prepared according to known methods. For example, that used in reaction (a) is advantageously prepared by condensation of anilines or nitrobenzenes with alkanoic acid halides analogous to reaction (d) and reduction of any resulting nitro-compound to the aniline and, if desired, conversion of its amino group into a tert. amino group. The starting material used in reaction (b) can be prepared analogous to reaction (a), pyrolysis of the resulting Mannich salt and addition of a hydrogen halide to the unsaturated ketone obtained, or analogous to reaction (d). That used in reaction (c) analogous to process (b), i.e. by reaction of a β-haloalkanoyl-aniline with an N-(2-aminoalkyl)-N-arylamine or a monohalide thereof. The starting material used in reaction (d) can be obtained by conversion of the corresponding acid with a thioyl halide, phosphorus oxyhalide or ketene, or analogous to reaction (b) respectively, i.e. by condensing a reactive ester of the corresponding alcohol with a 4-unsubstituted 1-arylpiperazine. That used in reaction (e), or lower alkyl ethers thereof, can also be obtained analogous to reaction (b) and cleavage of any resulting ether, for example, with the use of dry Grignard compounds; or by reaction of the corresponding ketones, in which Am is prim. or sec. amino, with sodium borohydride. The alcohols used in reaction (e) are new and are, therefore, included within the scope of the present invention. They also exhibit valuable pharmacological properties, comparable to those of the compounds of Formula I, especially hypotensive effects. This can be demonstrated in animal tests using, for example mammals, such as dogs or rats, as test objects. Particularly valuable compounds are those alcohols, yielding according to reaction (e) the compounds of Formula II. They show, when orally applied to dogs at doses between about 0.5 and 5 mg./kg./day, outstanding hypotensive effects.

The compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient.

The following examples are intended to illustrate the invention and are not to be construed as being limitations thereon. Temperatures are given in degrees centigrade, and all parts wherever given are parts by weight.

EXAMPLE 1

To the stirred mixture of 20.5 g. 4'-morpholino-acetophenone, 26.5 g. 1-(2-methoxyphenyl)-piperazine dihydrochloride, 7.5 g. paraformaldehyde and 100 ml. ethanol, 10 ml. concentrated ethanolic hydrochloric acid are added and the whole is refluxed for 24 hours. The reaction mixture is allowed to stand in the refrigerator for several hours, then filtered, the residue washed with diethyl ether and recrystallized from ethanol to yield the 3-[4-(2-methoxyphenyl)-piperazino]-4'-morpholino- propiophenone dihydrochloride of the formula

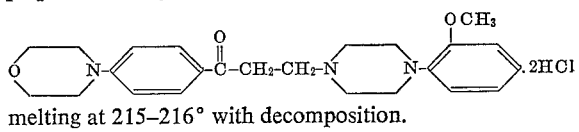

melting at 215–216° with decomposition.

EXAMPLE 2

According to the method shown in Example 1, the following compounds are prepared from equivalent amounts of the corresponding starting materials (all salts melt with decomposition):

(a) 3-[4-(2-methoxyphenyl) - piperazino] - 3'-nitro-4'-morpholino-propiophenone dihydrochloride, M.P. 200–202° (methanol);

(b) 3-[4-(2-chlorophenyl) - piperazino] - 4'-mopholinopropiophenone dihydrochloride, M.P. 176° (ethanol);
(c) 3-[4-(4-chlorophenyl) - piperazino] - 4'-morpholino-propiophenone hydrochloride, M.P. 226° (ethanol);
(d) 3-[4-(2-pyridyl)-piperazino] - 4'-morpholino-propiophenone trihydrochloride, M.P. 166–168° (ethanol);
(e) 3-[4-(2-methoxyphenyl)-piperazino]-4' - (4-methylpiperazino)-propiophenone trihydrochloride, M.P. 195–197° (methanol);
(f) 3-[4 - (2-methoxyphenyl) - piperazino]-4'-[4-(2-hydroxyethyl) - piperazino] - propiophenone trihydrochloride, M.P. 193–194° (methanol);
(g) 3-[4-(2-pyridyl) - piperazino] - 4'-(4-methylpiperazino)-propiophenone trihydrochloride, M.P. 246–248° (ethanol) and
(h) 3-[4-(2-pyridyl) - piperazino]-4' - [4-(2-hydroxyethyl)-piperazino]-propiophenone trihydrochloride, M.P. 197–198° (methanol).

EXAMPLE 3

The mixture of 5.1 g. 3-bromo-4'-dimethylamino-propiophenone, 3.9 g. 1-(2-chlorophenyl)-piperazine, 3.0 g. anhydrous sodium carbonate and 30 ml. isopropanol is refluxed for 24 hours while stirring. Hereupon the mixture is filtered, the filtrate evaporated in vacuo, the residue dissolved in diethyl ether, the solution washed with water and extracted wth 5% hydrochloric acid. The aqueous solution is concentrated, the concentrate chilled, the precipitate formed filtered off and recrystallized from ethanol to yield the 3-[4-(2-chlorophenyl)-piperazino]-4'-dimethylamino-propiophenone dihydrochloride of the formula

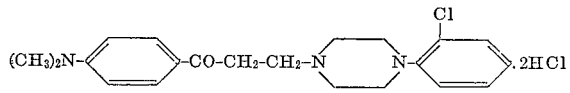

melting at 180–182° with decomposition.

The starting material is prepared as follows: To the stirred mixture of 16.3 g. 4'-dimethylamino-acetophenone, 8.2 g. dimethylamine hydrochloride, 7.5 g. paraformaldehyde and 100 ml. ethanol, 10 ml. concentrated ethanolic hydrochloric acid are added and the whole is refluxed for 24 hours. The reaction mixture is evaporated and the residue heated to about 120–130° for 3 hours. The residue is triturated with diethyl ether, decolorized with charcoal and recrystallized from ethanol-benzene to yield the 4-acryloyl-N,N-dimethylaniline.

5.0 g. thereof are dissolved in the minimum amount of diethyl ether, and the solution is gassed with dry hydrogen bromide at room temperature. Hereupon the reaction mixture is evaporated, the residue taken up in water, the mixture slightly basified with aqueous ammonia and extracted with diethyl ether. The extract is washed with water, dried, filtered and evaporated to yield the 3-bromo-4'-dimethylamino-propiophenone, which is used without further purification.

In the analogous manner the 3-bromo-4'-(piperidino, morpholino or 4-methyl-piperazino)-propiophenones can be prepared.

EXAMPLE 4

The mixture of 2.2 g. 3-amino-4'-morpholino-propiophenone, 2.5 g. N,N-bis-(2-chloroethyl)-2-chloroaniline, 4.0 g. potassium carbonate and 50 ml. ethanol is refluxed overnight while stirring. It is filtered hot, the residue washed with ethanol and the filtrate evaporated in vacuo. The residue is taken up in ethyl acetate, the solution acidified with hydrogen chloride in ethyl acetate and the precipitate formed recrystallized from ethanol to yield the 3-[4-(2-chlorophenyl) - piperazino] - 4'-morpholino-propiophenone dihydrochloride melting at 175–176°; it is identical with the product obtained according to Example 2(b).

The starting material is prepared as follows: The mixture of 2.9 g. 3-bromo-4'-morpholino-propiophenone, 1.86 g. potassium phthalimide, one crystal potassium iodide and 10 ml. dimethyl-formamide is refluxed for 10 hours. It is poured onto ice, the mixture extracted with chloroform and the extract washed with aqueous potassium hydroxide, 0.5 N hydrochloric acid and water, dried and evaporated. The residue is taken up in a solution of 2 ml. hydrazine hydrate in 20 ml. methanol and the mixture refluxed for 3 hours. It is cooled, acidified with concentrated hydrochloric acid, again refluxed for 30 minutes and filtered. The filtrate is evaporated under reduced pressure, the residue taken up in water, the solution made basic with aqueous potassium hydroxide and extracted with diethyl ether. The extract is dried, filtered and evaporated to yield the 3-amino-4'-morpholino-propiophenone, which is used without further purification.

EXAMPLE 5

The mixture of 3.4 g. N-(2-chlorophenyl)-N'-[2-(4-dimethylaminobenzoyl)-ethyl]-ethylenediamine, 1.88 g. ethylene dibromide, 4.0 g. potassium carbonate, 10 ml. n-butanol and a drop of water is refluxed overnight while stirring. It is filtered hot, the residue washed with ethanol and the filtrate evaporated. The residue is taken up in ethyl acetate, the solution acidified with hydrogen chloride in ethyl acetate and the precipitate formed recrystallized from ethanol to yield the 3-[4-(2-chlorophenyl)-piperazino] - 4'-dimethylamino-propiophenone dihydrochloride melting at 180–182°; it is identical with the product obtained according to Example 3.

The starting material is prepared as follows: The mixture of 1.71 g. N-(2-chlorophenyl)-ethylenediamine, 2.56 g. 3-bromo-4'-dimethylamino-propiophenone and 15 ml. ethanol is kept in a sealed tube at the water bath for 10 hours. It is evaporated, the residue made basic with aqueous potassium hydroxide and extracted with benzene. The extract is dried and evaporated to yield the N-(2-chlorophenyl)-N' - [2-(4-dimethylaminobenzoyl)-ethyl]-ethylene-diamine, which is used without further purification.

EXAMPLE 6

Analogous to the method described in Example 1, the following compounds are prepared from equivalent amounts of the corresponding starting materials:
(a) 3-[4-(2-chlorophenyl)-piperazino]-4'-piperidino-propiophenone dihydrochloride, M.P. 205–207° (dec., methanol)
(b) 3-[4-(2-chlorophenyl)-piperazino]-4'-(3-aza-3-bicyclo[3,2,2]-nonyl)-propiophenone trihydrochloride, M.P. 149–150° (dec., ethanol)
(c) 3-[4-(2-chlorophenyl)-piperazino]-4'-(4-phenyl-piperidino)-propiophenone dihydrochloride, M.P. 211–213° (dec., methanol)
(d) 3-[4-(2-chlorophenyl)-piperazino]-4'-(4-hydroxy-4-phenylpiperidino)-propiophenone dihydrochloride, M.P. 128–130° (dec., ethanol)
(e) 3-[4-(2-chlorophenyl)-piperazino]-4'-(4-phenyl-piperazino)-propiophenone dihydrochloride, M.P. 212–213° (dec., methanol)

The 4-tert. amino-acetophenones can be prepared as follows: The mixture of 13.8 g. 4'-fluoro-acetophenone, 25.0 g. 3-aza-bicyclo[3,2,2]nonane and 100 ml. dimethylsulfoxide is heated to 100° for 24 hours while stirring. After cooling it is poured into about 1.8 liter ice water and the mixture stirred for ½ an hour. The precipitate formed is filtered off, washed with water, dried and recrystalilzed from ethanol to yield the 4'-(3-aza-3-bicyclo [3,2,2]nonyl)-acetophenone melting at 91–94°.

In the analogous manner the following starting materials are obtained from equivalent amounts of the corresponding reactants: 4'-dimethylamino-acetophenone, M.P. 83–85°; 4'-pyrrolidino-acetophenone, M.P. 121–123°; 4'-piperidino-acetophenone, M.P. 88–90°; 4'-(4-phenyl-piperidino)-acetophenone, M.P. 151–153°; 4'-(4-hydroxy-4-phenyl-piperidino)-acetophenone, M.P. 187–189°; 4'-(4-phenyl-piperazino)-acetophenone, M.P. 180–183°.

EXAMPLE 7

The mixture of 3.6 g. 3-[4-(2-chlorophenyl)-piperazino]-4'-fluoro-propiophenone, 1.25 g. 3-aza-bicyclo[3,2,2]nonane and 20 ml. dimethylsulfoxide, is heated to 100° for 24 hours while stirring. It is then poured into ice water, the mixture stirred for ½ an hour and the residue formed filtered off. It it dried, taken up in the minimum amount of ethanol, the solution acidified with ethanolic hydrochloric acid, the precipitate formed filtered off and recrystallized from ethanol to yield the 3-[4-(2-chlorophenyl)-piperazino] - 4' - (3-aza-3-bicyclo[3,2,2,]nonyl)-propiophenone trihydrochloride of the formula

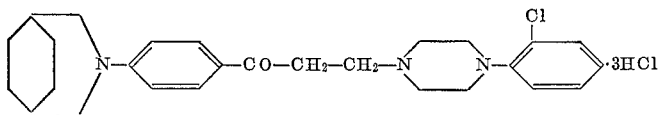

melting at 149–150°; it is identical with the product obtained according to Example 6(b).

The starting material is prepared as follows: To the stirred mixture of 1.4 g. 4'-fluoro-acetophenone, 2.4 g. 1-(2-chlorophenyl)-piperazine dihydrochloride, 0.75 g. paraformaldehyde and 25 ml. ethanol, 2 ml. concentrated ethanolic hydrochloric acid are added and the whole is refluxed for 24 hours while stirring. The mixture is evaporated in vacuo, the residue taken up in water, the mixture filtered and the filtrate made basic with sodium carbonate. The precipitate formed is filtered off and recrystallized from ethanol to yield the 3-[4-(2-chlorophenyl)-piperazino]-4'-fluoropropiophenone.

EXAMPLE 8

The mixture of 3.4 g. 2-methyl-3-[4-(2-pyridyl)-piperazino]-4'-fluoro-propiophenone, 0.9 g. morpholine and 20 ml. dimethylsulfoxide, is heated to 100° for 24 hours while stirring. It is poured into ice water, the mixture stirred for ½ an hour, the precipitate formed filtered off, washed with water and dried. It is dissolved in the minimum amount of ethanol, the solution acidified with ethanolic hydrochloric acid, the precipitate formed filtered off and recrystallized from ethanol to yield the 2-methyl-3-[4-(2-pyridyl)-piperazino] - 4' - morpholino-propiophenone trihydrochloride of the formula

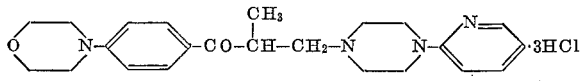

showing in the I.R.-spectrum interalia bands at 1661, 1600 and 754 cm.$^{-1}$.

The starting material is prepared as follows: To the solution of 16.3 g. 1-(2-pyridyl)-piperazine in 150 ml. ethanol, 35 ml. concentrated hydrochloric acid are added and the mixture stirred for 1 hour at room temperature. Hereupon 14.2 g. 4'-fluoropropiophenone and 7.5 g. paraformaldehyde are added while stirring and the mixture is refluxed for 24 hours and stirred at room temperature for 48 hours. It is evaporated in vacuo, the residue triturated with diethyl ether, filtered off and recrystallized from ethanol-diethyl ether to yield the 2-methyl-3-[4-(2-pyridyl)-piperazino]-4'-fluoro-propiophenone.

The 1-arylpiperazines may be prepared as follows: The mixture of 50.0 g. 2-bromo-pyridine, 54.0 g. piperazine, 100 ml. n-pentanol and 29 g. sodium carbonate heptahydrate is refluxed on a water trap for 8 hours while stirring. It is filtered hot, the residue washed with n-butanol, the filtrate evaporated in vacuo, the residue distilled and the fraction boiling at 150–154°/18 mm. Hg collected, to yield the 1-(2-pyridyl)-piperazine.

Analogously, the 1 - (4-methyl-2-pyridyl)-piperazine, B.P. 113–115°/0.25 mm. Hg and the 1-(2-pyrazinyl)-piperazine, B.P. 120–125°/0.1 mm. Hg, are prepared from equivalent amounts of the corresponding reactants.

EXAMPLE 9

The mixture of 1.1 g. 1-(4-morpholinophenyl)-3-[4-(2-methoxyphenyl)-piperazino]-propanol, 20 ml. dioxane, 5 ml. acetone and 0.5 g. aluminum tert. butoxide is slowly heated to about 55–60° while stirring and kept at this temperature overnight. Hereupon it is evaporated in vacuo, the residue taken up in water, the mixture extracted with chloroform, the extract dried, filtered and evaporated. The residue is taken up in the minimum amount of ethanol, the solution acidified with ethanolic hydrochloric acid, the precipitate formed filtered off and recrystallized from ethanol to yield the 3-[4-(2-methoxyphenyl)-piperazino]-4'-morpholino-propiophenone dihydrochloride melting at 215–216° (dec.); it is identical with the product obtained according to Example 1.

The starting material is obtained as follows: To the mixture of 0.8 g. magnesium turnings in 30 ml. diethyl ether, 7.0 g. 4-bromo-fluoro-benzene are added to form the corresponding Grignard compound. Hereupon 5.2 g. 1-ethoxy-1,3-dichloro-propane are added dropwise and the mixture stirred for 30 minutes at room temperature and refluxed for 1 hour. After standing overnight it is poured onto ice, the mixture acidified with hydrochloric acid and extracted with diethyl ether. The extract is washed with water, dried, filtered and evaporated. The residue is distilled and the fraction boiling at 100–110°/10 mm. Hg collected; it represents the 3-ethoxy-3-(4-fluorophenyl)-propyl bromide.

8.0 g. thereof are added to the mixture of 7.2 g. 1-(2-methoxy-phenyl)-piperazine, 4.0 g. sodium carbonate and 150 ml. ethanol, and the whole is refluxed for 24 hours. It is filtered hot and the filtrate evaporated in vacuo, to yield the 1-[3-ethoxy-3 - (4 - fluorophenyl)-propyl]-4-(2-methoxyphenyl)-piperazine.

The mixture of 3.5 g. thereof, 0.9 g. morpholine and 20 ml. dimethyl sulfoxide is heated to 100° for 24 hours while stirring. It is poured into ice water, the mixture extracted with chloroform, the extract dried, filtered and evaporated to yield the 1-[3-ethoxy-3-(4-morpholinophenyl)-propyl]-4-(2-methoxyphenyl)-piperazine.

The solution of 1.5 g. thereof in 30 ml. dioxane is added to 2.0 g. dry methyl magnesium iodide while stirring and the mixture is heated to 80° for 3 hours and evaporated in vacuo. The residue is taken up in water, extracted with chloroform, the extract washed with water, dried, filtered and evaporated. The residue is recrystallized from ethanol to yield the 1-(4 - morpholinophenyl)-3-[4-(2-methoxyphenyl)-piperazino]-propanol, melting at 127–129°.

EXAMPLE 10

In the manner described in the previous examples the 3-(4-phenylpiperazino)-4'-pyrrolidino-propiophenone dihydrochloride, 3-[4-(4-methyl-2-pyridyl)-piperazino]-4'-morpholino-propiophenone or the 3-[4 - (2-pyrazinyl)-piperazino]-4' - morpholino-propiophenone are prepared from equivalent amounts of the corresponding starting materials, described inter alia in Examples 6 and 8.

EXAMPLE 11

Preparation of 10,000 tablets each containing 10.0 mg. of the active ingredient.

| Formula: | G. |
|---|---|
| 3-[4 - (2 - methoxyphenyl)-piperazino]-4'-morpholino-propiophenone dihydrochloride | 100.00 |
| Lactose | 1,157.00 |
| Corn starch | 75.00 |
| Polyethylene glycol 6,000 | 75.00 |
| Talcum powder | 75.00 |
| Magnesium stearate | 18.00 |
| Purified water q.s. | |

Procedure.—All the powders are passed through a screen with an opening of 0.6 mm. Then the drug substance, lactose, talcum, magnesium stearate and half of the starch are mixed in a suitable mixer. The other half of the starch is suspended in 40 ml. water and the suspension added to the boiling solution of the polyethylene glycol in 150 ml. water. The paste formed is added to the powders which are granulated, if necessary, with an additional amount of water. The granulate is dried overnight at 35°, broken on a screen with 1.2 mm. openings and compressed into tablets using concave punches with 6.4 mm. diameter, uppers bisected.

EXAMPLE 12

Preparation of 10,000 tablets each containing 50.0 mg. of the active ingredient.

Formula:

| | G. |
|---|---|
| 3-[4 - (2 - methoxyphenyl)-piperazino]-4'-morpholino-propiophenone dihydrochloride | 500.00 |
| Lactose | 1,706.00 |
| Corn starch | 90.00 |
| Polyethylene glycol 6,000 | 90.00 |
| Talcum powder | 90.00 |
| Magnesium stearate | 24.00 |
| Purified water q.s. | |

Procedure.—All the powders are passed through a screen with an opening of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

EXAMPLE 13

Preparation of 10,000 capsules each containing 100.00 mg. of the active ingredient.

Formula:

| | G. |
|---|---|
| 3-[4 - (2 - methoxyphenyl)-piperazino]-4'-morpholino-propiophenone dihydrochloride | 1,000.0 |
| Lactose | 2,800.0 |
| Talcum powder | 200.0 |

Procedure.—All the powders are passed through a screen with an opening of 0.6 mm. Then the drug substance is placed in a suitable mixer and mixed first with the talcum, then with the lactose until homogeneous. No. 1 capsules are filled with 400 mg., using a capsule filling machine.

Instead of the active ingredient used in Examples 11–13, the same amount of 3-[4 - (2-chlorophenyl)-piperazino]-4'-morpholino-propiophenone dihydrochloride can be used.

I claim:

1. A compound being the 1-(4-morpholinophenyl)-3-[4-(2-methoxyphenyl)-piperazino]-propanol.

2. A compound having the formula

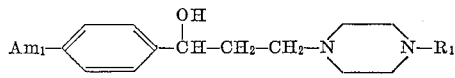

in which $Am_1$ is dimethylamino, pyrrolidino, piperidino, 3-aza-3-bicyclo[3,2,2]nonyl, 4-hydoxy-4-phenyl-piperidino, 4-phenyl-piperidino, 4 - methylpiperazino, 4 - ethylpiperazino, 4-(2 - hydroxyethyl)-piperazino, 4 - phenyl-piperazino or morpholino and $R_1$ is phenyl, 2-methoxyphenyl, 2- or 4-chlorophenyl, 2-pyridyl or 4-methyl-2-pyridyl, or a therapeutically useful acid addition salt thereof.

References Cited

UNITED STATES PATENTS 3,317,538  5/1967  Freed et al. _____ 260—268

ALEX MAZEL, Primary Examiner

J. TOVAR, Assistant Examiner

U.S. Cl. X.R.

260—247.1, 247.2, 268; 424—248, 250